United States Patent
Ojima et al.

(10) Patent No.: US 6,793,468 B2
(45) Date of Patent: Sep. 21, 2004

(54) TURBO-CHARGER FOR INTERNAL-COMBUSTION ENGINE

(75) Inventors: Kazuo Ojima, Hitachinaka (JP);
Noboru Baba, Hitachioota (JP);
Toshikatsu Akiyama, Higashiibaraki (JP); Katsuhiro Komuro, Hitachi (JP);
Tetsuo Udagawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/084,247

(22) Filed: Feb. 28, 2002

(65) Prior Publication Data

US 2003/0026715 A1 Feb. 6, 2003

(30) Foreign Application Priority Data

Jul. 31, 2001 (JP) .......................................... 2001-232525

(51) Int. Cl.[7] .............................. F04B 17/00; C22C 9/04
(52) U.S. Cl. .......................... 417/407; 60/608; 148/434
(58) Field of Search .......................... 417/407; 148/432, 148/434, 436, 437, 438, 424; 384/107, 912, 913

(56) References Cited

U.S. PATENT DOCUMENTS

| | | | | |
|---|---|---|---|---|
| 3,993,370 A | * | 11/1976 | Woollenweber | 417/407 |
| 4,676,848 A | * | 6/1987 | Ruchel et al. | 148/434 |
| 5,183,637 A | * | 2/1993 | Tanaka et al. | 420/479 |
| 5,282,908 A | * | 2/1994 | Nakashima et al. | 148/434 |
| 5,296,057 A | * | 3/1994 | Baba et al. | 148/436 |
| 5,346,668 A | * | 9/1994 | Tanaka et al. | 420/485 |
| 5,445,896 A | * | 8/1995 | Tanaka et al. | 428/647 |
| 5,700,093 A | * | 12/1997 | Hiramatsu et al. | 384/276 |
| 5,993,173 A | * | 11/1999 | Koike et al. | 417/407 |
| 6,071,361 A | * | 6/2000 | Sato et al. | 148/516 |
| 6,290,398 B1 | * | 9/2001 | Fujiwara et al. | 384/625 |
| 6,305,169 B1 | * | 10/2001 | Mallof | 60/608 |
| 6,334,914 B2 | * | 1/2002 | Sakai et al. | 148/433 |

FOREIGN PATENT DOCUMENTS

| | | | | |
|---|---|---|---|---|
| EP | 407596 A1 | * | 1/1991 | C22C/9/04 |
| GB | 2240785 A | * | 8/1991 | C22C/9/08 |
| GB | 2355016 A | * | 4/2001 | C22C/9/00 |
| GB | 2374086 A | * | 10/2002 | F16C/33/12 |
| JP | 56009346 A | * | 1/1981 | C22C/9/02 |
| JP | 57076143 A | * | 5/1982 | C22C/9/04 |
| JP | 60138228 A | * | 7/1985 | F02B/39/00 |
| JP | 60162742 A | * | 8/1985 | C22C/9/04 |
| JP | 62013549 A | * | 1/1987 | C22C/9/04 |
| JP | 6227036 A | * | 11/1987 | C22C/9/04 |
| JP | 62297429 A | * | 12/1987 | C22C/9/00 |
| JP | 01036743 A | * | 2/1989 | C22C/21/04 |

* cited by examiner

Primary Examiner—Thomas Denion
Assistant Examiner—Thai-Ba Trieu
(74) Attorney, Agent, or Firm—Crowell & Moring LLP

(57) ABSTRACT

A turbocharger for an internal combustion engine, in which a bearing having excellent abrasion resistance without generating a black corrosion product in a high-temperature oil environment is provided. As bearing materials of a turbocharger, a copper alloy material containing, as main components, Cu, Zn, Al, Mn, and Si is employed. The elongating direction of an Mn—Si compound crystallized in the alloy material is set to the axial direction of a rotary shaft with respect to a radial bearing and is set to the direction perpendicular to the rotary shaft with respect to a thrust bearing.

4 Claims, 11 Drawing Sheets

| MATERIAL | MAIN CHEMICAL COMPONENTS % | | | | | | | |
|---|---|---|---|---|---|---|---|---|
| | Cu | Al | Mn | Si | Pb | Fe | Sn | Zn |
| A | 70.0 | — | — | — | 6.52 | ≦0.1 | — | bal |
| B | 78.2 | — | — | — | 10.5 | 0.11 | bal | 0.83 |
| C | 60.8 | — | — | — | ≦0.1 | ≦0.1 | — | bal |
| D | 60.2 | — | — | — | 1.30 | ≦0.1 | — | bal |
| E | 62.1 | 3.05 | 3.16 | 0.92 | ≦0.2 | — | — | bal |
| F | 58.3 | 0.69 | 3.72 | 1.46 | — | — | — | bal |

| MATERIAL | MAIN CHEMICAL COMPONENTS % | | | | | | | |
|---|---|---|---|---|---|---|---|---|
| | Cu | Al | Mn | Si | Pb | Fe | Sn | Zn |
| A | 70.0 | — | — | — | 6.52 | ≦ 0.1 | — | bal |
| B | 78.2 | — | — | — | 10.5 | 0.11 | bal | 0.83 |
| C | 60.8 | — | — | — | ≦ 0.1 | ≦ 0.1 | — | bal |
| D | 60.2 | — | — | — | 1.30 | ≦ 0.1 | — | bal |
| E | 62.1 | 3.05 | 3.16 | 0.92 | ≦ 0.2 | — | — | bal |
| F | 58.3 | 0.69 | 3.72 | 1.46 | — | — | — | bal |

FIG. 6

| Mn-Si COMPOUND AND DIRECTION OF SLIDING | SLIDING PERPENDICULAR TO THE DIAMETER DIRECTION | SLIDING PARALLEL TO THE LONGITUDINAL DIRECTION | SLIDING PERPENDICULAR TO THE LONGITUDINAL DIRECTION |
|---|---|---|---|
| SKETCH (ARROW:SLIDING DIRECTION) | 20 | 20 | 20 |
| ABRASION AMOUNT FOR COMPARISON | 6.8 | 4.5 | 1.0 |

FIG. 7

| MATERIAL | A | B | C | D | E | F |
|---|---|---|---|---|---|---|
| TEMPERATURE °C FOR EVALUATION | 180 | | | | 250 | |
| CHANGE IN WEIGHT FOR COMPARISON | 59.2 | 1065 | 2.2 | 1.6 | 1.3 | 1.0 |
| JUDGMENT | GOOD | BAD | VERY GOOD | VERY GOOD | VERY GOOD | VERY GOOD |

| MATERIAL / SPEED | A | B | C | D | E | F | REMARKS |
|---|---|---|---|---|---|---|---|
| 1.2 m/s | 17 | 21 | 16 | 69 | 1.7 | 0.87 | LOW-SPEED CONDITION |
| 7.2 m/s | 17 | 15 | 23 | 22 | 1.7 | 0.92 | HIGH-SPEED CONDITION |
| AVERAGE | 17 | 18 | 20 | 46 | 1.7 | 0.90 | (LOW SPEED + HIGH SPEED)/2 |
| ABRASION AMOUNT FOR COMPARISON | 19 | 20 | 22 | 51 | 1.9 | 1.0 | |
| JUDGMENT | GOOD | GOOD | GOOD | BAD | VERY GOOD | VERY GOOD | |

MATERIAL:C    AFTER IMMERSION IN OIL OF 180°C FOR 48 HOURS

MATERIAL:D
NEW MATERIAL BLOCK BEFORE IMMERSION IN HIGH-TEMPERATURE OIL

MATERIAL:E
AFTER IMMERSION IN OIL OF 250 ℃ FOR 48 HOURS

MATERIAL:F
AFTER IMMERSION IN OIL OF 250 ℃ FOR 48 HOURS

TURBO-CHARGER FOR INTERNAL-COMBUSTION ENGINE

BACKGROUND OF THE INVENTION

The present invention relates to a turbocharger for an internal combustion engine and, more particularly, to a bearing of a rotary shaft obtained by integrating a turbine blade and a compressor blade.

Generally speaking, a turbocharger for an internal combustion engine is driven by exhaust gas energy. In the turbocharger, a turbine housing and a compressor housing are disposed so as to sandwich a bearing housing of a rotary drive shaft.

A turbine blade which receives pressure and temperature energy of an internal combustion engine exhaust gas and rotates is attached to one end of the rotary shaft, and a compressor blade which is rotated by the power of the turbine blade and compresses air by the centrifugal rotation force to generate boost pressure is attached to the other end of the rotary shaft.

As a radial bearing of the rotary shaft of an exhaust gas turbine (i.e., rotary shaft of the turbocharger), one which is resistant to high-speed rotation and shaft vibration is used. As an optimum radial bearing, a floating metal (or floating bearing) is used.

In a radial floating metal bearing, a proper clearance is set between the inner side of the bearing and the outer side of the rotary shaft and between the outer side of the bearing and the inner side of the bearing housing. Engine oil is applied to the clearance and the rotary shaft is supported in a floating state by an oil film of the engine oil.

Such radial bearings are disclosed in Japanese application patent laid-open publication Nos. Hei 6-42361 and Hei 11-36878.

As described in the publications, a thrust bearing for the turbocharger is often in contact with an end face of the bearing housing on the compressor side relatively apart from the turbine side.

Concretely, by connecting a pipe branched from a lubricant oil path of the body of an internal combustion engine to the bearing housing of the turbocharger for an internal combustion engine, the engine oil is supplied in a manner similar to the bearings of the internal combustion engine.

The engine oil supplied to the bearing housing is force fed into an annular gap formed along the inner side of the radial bearing, an annular gap formed along the outer side, and gaps formed on the right and left side faces of the thrust bearing via oil paths, and an optimum oil film is formed in each of the gaps. With this configuration, a damping action for suppressing shaft vibration which occurs when the rotary shaft rotates at high speed is displayed, and the stable state of the rotary shaft which rotates at 100,000 rpm/min is maintained.

One type of turbocharger uses two radial bearings and another type uses only one radial bearing. In the former type, the radial bearings are disposed on the turbine blade side and the compressor blade side of the rotary shaft. In the latter type, a sleeve-shaped radial bearing which is relatively long in the axial direction is disposed in the center portion of the rotary shaft. There are also two other types; namely a type in which rotation of the radial bearing itself is regulated, and a type in which the radial bearing itself is also rotated in association with the rotation of the rotary shaft.

SUMMARY OF THE INVENTION

For both of the radial and thrust bearings of a turbocharger for an internal combustion engine of recent years, a copper alloy material is used. A lead bronze casting typified by CAC603, a sintered material corresponding to the above, and a brass alloy containing about 70% of Cu are the predominant materials.

It is known that, when oil cooling is not considered, the temperature of the engine oil becomes very high, and the bearings are attached by an S component in the engine oil in a high-temperature environment, corrode and turn black. A black corrosion product generated on the surface of a bearing is easily peeled by abrasion, and it causes abnormal abrasion in the bearing.

Particularly, the turbocharger of an exhaust gas turbine type uses exhaust gas heat energy, so that the temperature becomes high. In a high-temperature engine room atmosphere immediately after high-speed and high-load driving of an internal combustion engine, the temperature increases to about 250° C. in the radial bearing on the turbine side and to about 180° C. in the thrust bearing, so that a high temperature environment occurs in which the black corrosion product is created.

To suppress the black corrosion product generated in the copper alloy materials, it is effective to use a brass alloy material containing about 60% of Cu.

A general brass alloy material has, on one hand, excellent machinability. On the other hand, the machinability severely deteriorates the abrasion resistance. In the case of using the material for a turbocharger bearing, abnormal abrasion occurs in relatively short time due to disturbances such as shaft vibration of the high-speed rotary shaft and metal contamination floating in the engine oil. Under present circumstances, it is difficult to use the material.

An object of the invention is to provide an exhaust turbocharger having excellent durability by a bearing structure with excellent abrasion resistance without generating a black corrosion product even in a high-temperature oil environment.

According to the invention, to achieve the foregoing object, basically, in a turbocharger for an internal combustion engine, a radial bearing for supporting a rotary shaft of the turbocharger is made of a copper alloy containing, as main components, Cu, Zn, Al, Mn, and Si.

In the configuration, by maintaining basic alloy components of a general brass containing Cu and Zn as main components (60% of Zn), a black corrosion product which is generated in the high-temperature engine oil environment can be suppressed. Moreover, by adding Al, Mn, and Si, the hardness of the alloy is increased, and abrasion resistance of the rotary shaft of the turbocharger which rotates at high speed can be also improved.

For example, a turbocharger according to the invention is provided with a radial bearing made of a brass copper alloy containing 54 to 64 wt % of Cu, 0.2 to 3.0 wt % of Si, 0.2 to 7.0 wt % of Mn, 0.5 to 3.5 wt % of Al, and the rest of substantially Zn.

In such a configuration, in a radial bearing for supporting a rotary shaft of the turbocharger, an Mn—Si compound is crystallized as a hard phase in a brass base material. The crystallized compound is an element which improves the abrasion resistance of the rotary shaft.

In order to display abrasion resistance more effectively, the Mn—Si compound is dispersed so as to be elongated in the axial direction of the radial bearing.

BRIEF DESCRIPTION OF THE DRAWINGS

These and other objects, features and advantages of the present invention will become more readily apparent from the following detailed description of currently preferred configurations thereof when taken in conjunction with the accompanying drawings wherein:

FIG. 6 is an explanatory diagram showing the relation between the sliding direction with respect to the Mn—Si compound crystallized out on the bearing member and an abrasion amount.

FIG. 7 is an explanatory diagram showing evaluation on protection against corrosion of the bearing members for the turbocharger according to the embodiment of the invention and those of the comparative examples.

DETAILED DESCRIPTION OF THE CURRENTLY PREFERRED EMBODIMENTS

Figure 1:
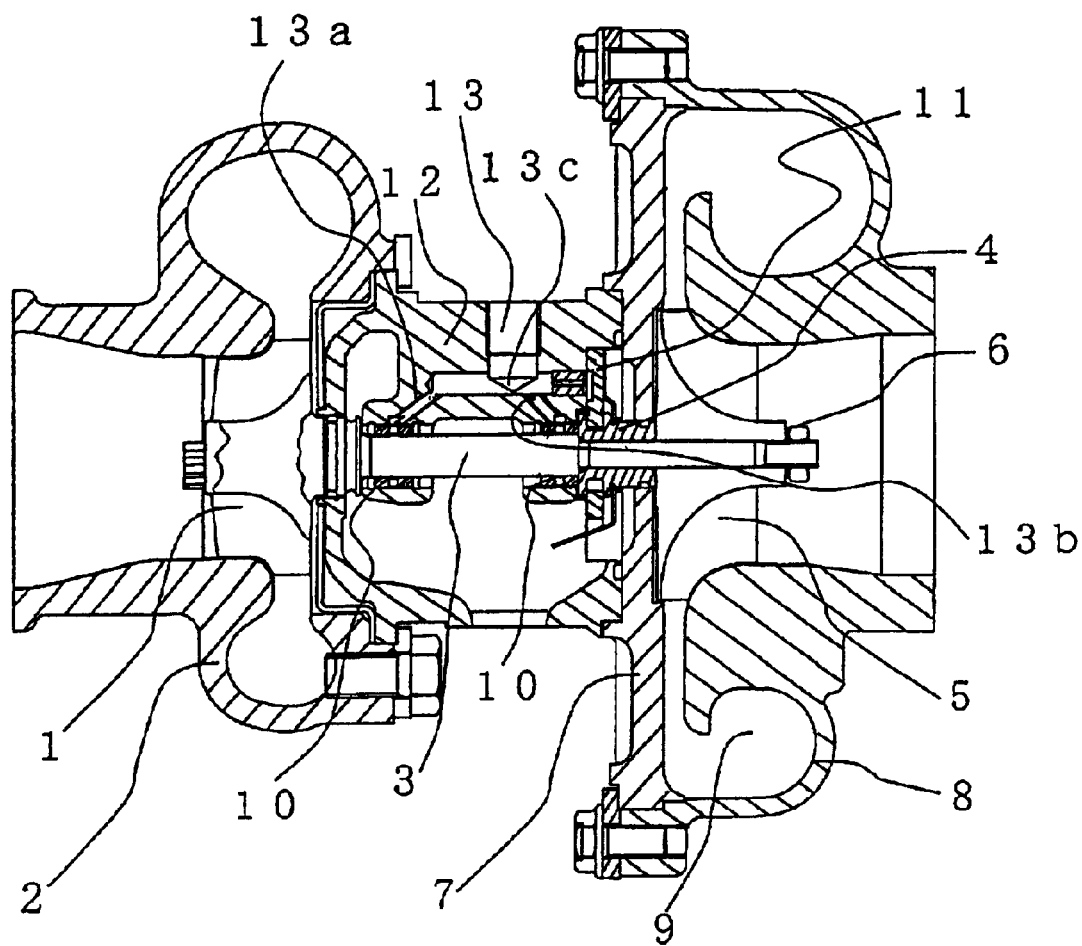
FIG. 1 is a cross section showing the structure of a turbocharger for an internal combustion engine according to an embodiment of the invention.

The internal combustion engine turbocharger shown in FIG. 1 has a charger body that is constructed by a bearing housing 12, a turbine housing 2, and a compressor housing 8. The turbine housing 2 and compressor housing 8 are disposed on both sides of the bearing housing 12.

A rotary shaft 3 is supported by two radial bearings 10 and one thrust bearing 11 disposed in the bearing housing 12. A turbine blade 1 is attached to one end of the rotary shaft 3, and a compressor blade 5 is attached to the other end.

As each of the radial bearings 10 for supporting rotation in the radial direction of the rotary shaft 3, which is resistant to high-speed rotation and shaft vibration, a floating metal bearing using engine oil is used. On the right and left side faces of the thrust bearing 11, the engine oil is also introduced and an oil film is formed. The structure and material of the bearings 10 will be described below.

Exhaust gas from each of cylinders of the internal combustion engine is collected in a known way by an exhaust pipe (not shown) disposed on the internal combustion engine side and introduced to the turbine housing 2. The turbine blade 1 and the rotary shaft 3 are integrally joined and positioned in the center portion of the turbine housing 2. The compressor blade 5 is integrally fastened to the rotary shaft 3 by engagement of a male screw formed at an end of the rotary shaft 3 and a lock nut 6. The turbine blade 1 and the rotary shaft 3 are integrated by, for example, friction welding.

The thrust bearing 11 for regulating movement in the thrust direction of the rotary shaft 3 is provided at one end of the bearing housing 12 near to the compressor.

A collar (thrust collar) 4 adapted to the thrust shaft fit in the thrust bearing 11 is assembled, together with the compressor blade 5, to the rotary shaft 3 and fixed to the rotary shaft 3 by fastening of the lock nut 6.

When the turbine blade 1 rotates at high speed by the pressure and temperature energy of the exhaust gas introduced into the turbine housing 2, the rotary shaft 3, thrust collar 4, and compressor blade 5 integrated with the turbine blade 1 similarly rotate at high speed.

A scroll path 9 of the compressor is constructed by a housing 8 and a scroll plate 7. By the rotation of the compressor blade 5, compressed air is generated in the scroll path 9 and force-fed into an intake path of the internal combustion engine.

The configuration of the radial bearing 10 and thrust bearing 11 will now be described.

The radial bearings 10 of the embodiment are of a full-float type and disposed in positions near to both ends of the bearing housing 12.

In the bearing housing 12, a path 13 for introducing the engine oil, an oil path 13c communicated with the path 13, and paths 13a and 13b branched from the oil path 13c are formed. The engine oil of the internal combustion engine is supplied to the radial bearings 10 and thrust bearing 11 via the paths.

Figure 2:
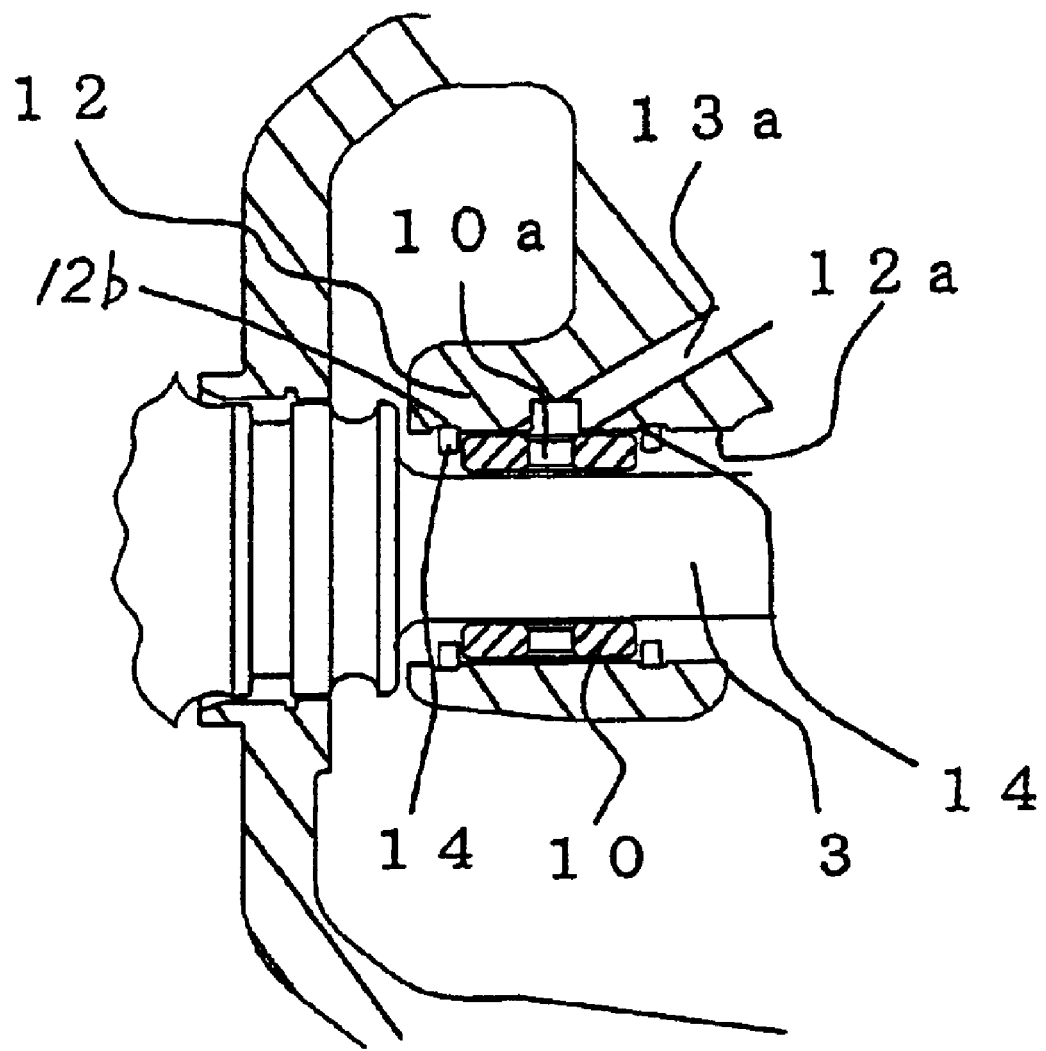
FIG. 2 is a partly enlarged cross section showing an attaching structure of a radial bearing on a turbine side of the turbocharger illustrated in FIG. 1.
Figure 3:
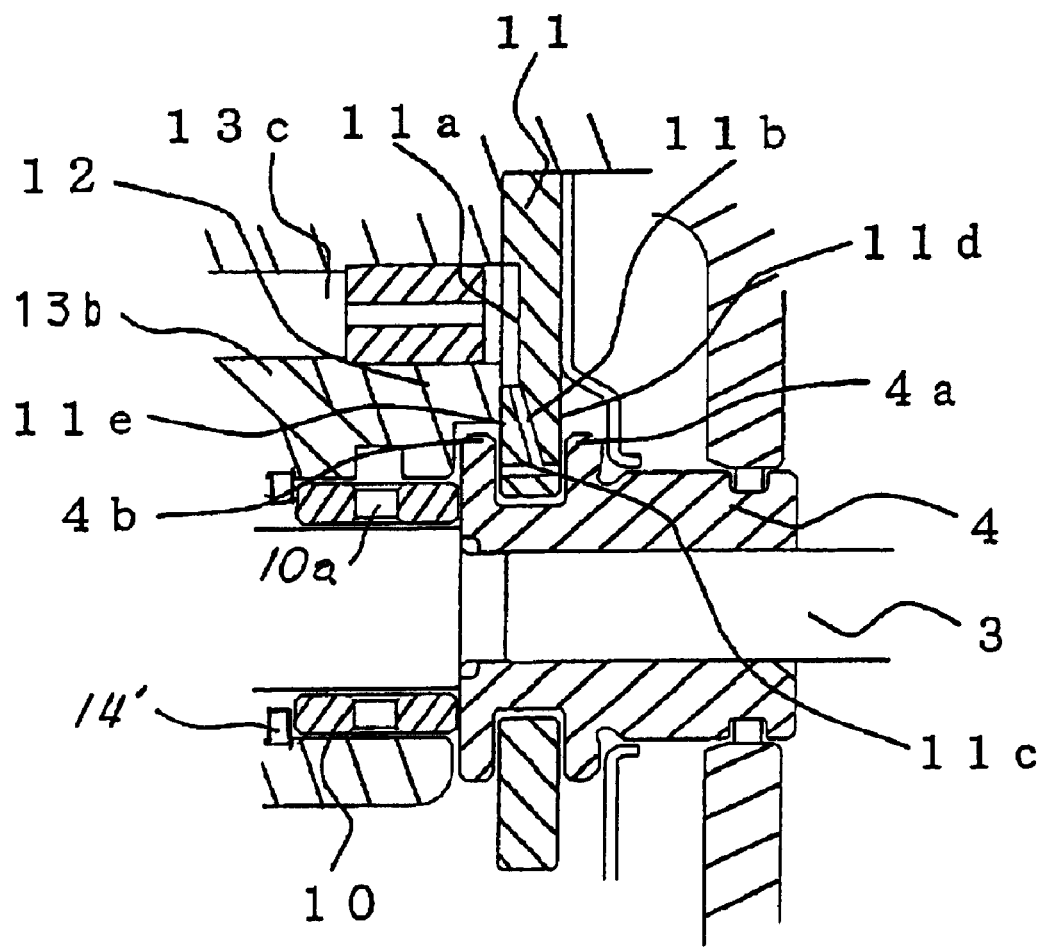
FIG. 3 is a cross section showing an attaching structure of the radial bearing and a thrust bearing on a compressor side of the turbocharger illustrated in FIG. 1.

FIGS. 2 and 3 are enlarged views of a portion around the radial bearings 10 and thrust bearing 11.

FIG. 2 is a cross section showing an attaching structure of the radial bearing 10 on the turbine side, and FIG. 3 is a cross section showing an attaching structure of the radial bearings 10 and thrust bearing 11 on the compressor side.

As shown in FIG. 2, two annular grooves 12b are formed in an inner portion 12a (inner circumference of a hole through which the rotary shaft is passed) of the bearing housing 12, and two stopper rings 14 for regulating movement in the axial direction of the radial bearings 10 are inserted and fixed in the grooves 12b. The radial bearing 10 on the turbine side is provided between the stopper rings 14. On the other hand, the radial bearing 10 on the compressor side is disposed between a stopper ring 14' inserted and fixed in the inner circumference of the bearing and the thrust collar 4.

The radial bearings 10 are full floating metals whose inner and outer circumferences are supported by oil films. Therefore, a plurality of oil passing holes (orifices) 10a penetrating the ring-shaped metal are provided at equal intervals in the circumferential direction. A proper clearance is set between the inner portion 12a of the bearing housing 12 and the outer portion of the radial bearing 10 and between the inner portion of the radial bearing 10 and the outer portion of the rotary shaft 3.

Engine oil is force-fed via the oil path 13a to the outer portion (clearance) of the radial bearing 10 on the turbine side, and is also supplied to the inner portion (clearance) of the radial bearing 10 via the orifices 10a formed in the bearing 10. Similarly, the engine oil is supplied to the outer and inner portions of the radial bearing 10 on the compressor side via the orifices 10a formed in the oil path 13b and the bearing.

Therefore, in each of the proper clearances between the inner portion 12a of the bearing housing 12 and the outer portion of the radial bearing 10 and in the proper clearance between the inner portion of the radial bearing 10 and the outer circumferential portion of the rotary shaft 3, a required oil film is assured. Thereby, the action of damping the high-speed driving of the rotary shaft 3 and the like can be sufficiently achieved, and stable high-speed rotating operation can be maintained.

For the thrust bearing portion shown in FIG. 3 as well, the engine oil is supplied in a manner similar to the radial bearings 10.

Generally, in the thrust bearing 11 fixed to an end face of the bearing housing 12 by a screw or the like, an oil feeding path 11a and oil feeding holes 11b, 11c are formed. The oil feeding path 11a is communicated with the oil path 13c in the bearing housing 12. In a manner similar to the radial bearing 10, the engine oil is supplied to the oil feeding path 11a.

The engine oil supplied to the oil feeding path 11a is force fed to the proper clearances assured on both side faces 11d, 11e of the thrust bearing 11 via the oil supplying holes 11b, 11c and is also force fed to the proper clearance assured between the thrust bearing and flanges 4a, 4b of the thrust collar 4.

With the foregoing configuration, an oil film having a required thickness is assured in each of the clearances to support high-speed rotation of the rotary shaft 3 and the damping action in the thrust direction for sudden acceleration/deceleration driving and the like are sufficiently obtained. Thus, stable high-speed rotational motion is maintained.

In the above structure, a driving mode in which the bearing portion is in the severest environment from the viewpoint of temperature will be described.

During operation of the internal combustion engine, the engine oil branched from the lubricating oil path of the internal combustion engine is supplied to each of the bearings. Consequently, in the temperature environment of the radial bearings 10 and thrust bearing 11, the temperature of the engine oil is dominant. The temperature is around 100° C. during general city driving and is about 150° C. during high-speed driving and continuous driving on a hill.

However, in a stop mode after high-speed driving and continuous driving on a hill, due to heat radiation and heat transmission from the turbine housing 2 in which heat is accumulated by the exhaust gas during driving, a heat soak back phenomenon in which the temperature environment becomes equal to or higher than the temperature during driving after the internal combustion engine stops occurs. The temperature in the radial bearing 10 on the turbine side rises to around 250° C. and the temperature in the thrust bearing 11 increases around 180° C.

Even in the state where the internal combustion engine is stopped, the engine oil remains in the proper clearances set in the inner and outer portions of the radial bearings 10 and both end faces of the thrust bearing 11. In the case where the radial bearings 10 and the thrust bearing 11 are made of conventional materials, if any of countermeasure (for example, cooling) is not taken in the high-temperature environment when the heat soak back phenomenon occurs, the bearings are attacked by the high-temperature engine oil, and a black corrosion product is created relatively easily.

In the embodiment, a turbocharger having bearings achieving sufficient protection against corrosion and abrasion resistance even in the high-temperature engine oil environment is provided. After trial and error, the inventors herein have found that a bearing of a turbocharger sufficiently resistant in the high-temperature engine oil environment is achieved by making the radial bearings of a copper alloy whose main components are Cu, Zn, Al, Mn, and Si, so that the radial bearing is made of such a copper alloy.

Various materials of the bearings of a turbocharger of this kind were examined, and evaluation on results of protection-against-corrosion tests in an engine oil of high temperatures (180° C. and 250° C.) of the materials will be described.

Figures 4, 5:
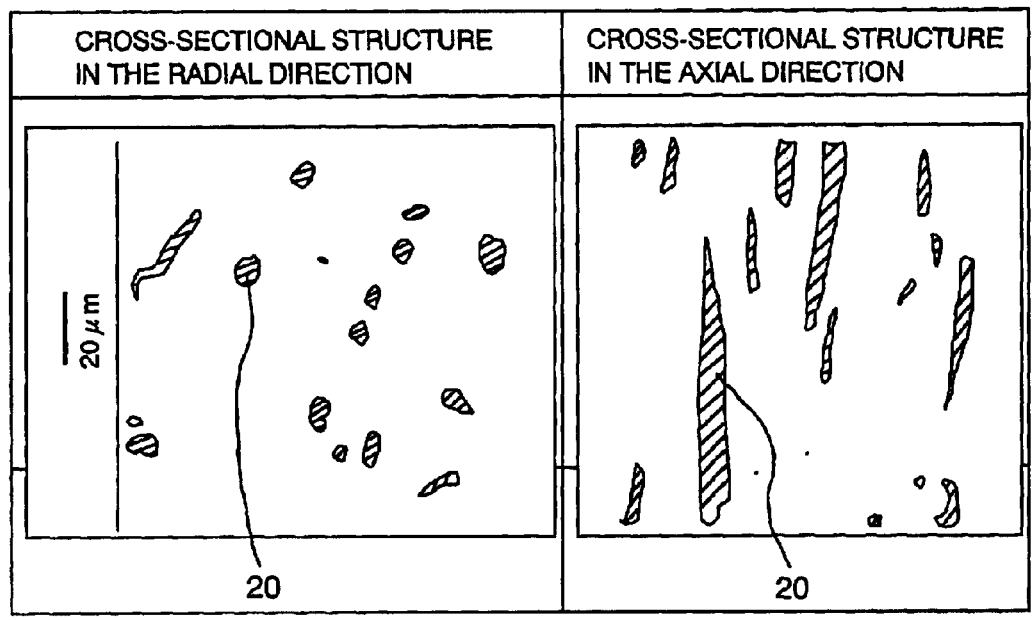
FIG. 4 is a microscope observation diagram showing a cross-sectional structure in the radial direction and a cross sectional structure in the axial direction of an Mn—Si compound crystallized out on a bearing member of the invention.
FIG. 5 is a diagram showing examples of composition of a bearing member for a turbocharger according to the embodiment of the invention and compositions of comparative examples.

FIG. 5 shows materials used in this examination.

Materials A and B in FIG. 5 are generally employed for a bearing for a turbocharger according to a conventional technique. Material A is a brass alloy (containing 70 wt % of Cu, 6.52 wt % of Pb, 0.1 wt % of Fe, and the remainder of Zn), and a material B is lead bronze (containing 78.2 wt % of Cu, 10.5 wt % of Pb, 0.11 wt % of Fe, 0.83 wt % of Zn, and the remainder of Sn). Materials C and D are specimens (general brass material containing about 60% of Cu) each examined as the bearing material but not employed due to inferior abrasion resistance. Materials C and D are brass alloys each having the effect of preventing occurrence of a black corrosion product. The material C contains 60.8 wt % of Cu, 0.1 wt % or less of Pb, 0.1 wt % or less of Fe, and the remainder of Zn. The material D contains 60.2 wt % of Cu, 1.30 wt % of Pb, 0.1 wt % or less of Fe, and the remainder of Zn.

Materials E and F are materials utilized in the present invention intended to prevent occurrence of a black corrosion product and improve abrasion resistance. The material E is a brass alloy containing 62.1 wt % of Cu, 3.05 wt % of Al, 3.16 wt % of Mn, 0.92 wt % of Si, 0.2 wt % or less of Pb, and the remainder of Zn. Such a brass alloy itself is known as YZ6 (manufactured by Daido Metal) but was an unknown material for a bearing in a conventional turbocharger. The material F is a brass alloy containing 58.3 wt % of Cu, 0.69 wt % of Al, 3.72 wt % of Mn, 1.46 wt % of Si, and the remainder of Zn. Such a brass alloy itself is known as SAM214 (manufactured by Hitachi, Ltd.) but also was an unknown bearing material in a conventional turbocharger.

To the bearing for a turbocharger made of the material E as an embodiment of the invention, a small amount of Pb ($\leq 0.2\%$) was added to improve machinability. Also by adding an element for improving machinability considering resistance to severe environment of Bi or the like, a similar effect can be obtained.

FIGS. 9 to 19 are external view photographs showing evaluation tests conducted on samples before being immersed in high-temperature oil (new items) and after immersed for predetermined time.

Figures 8, 9:
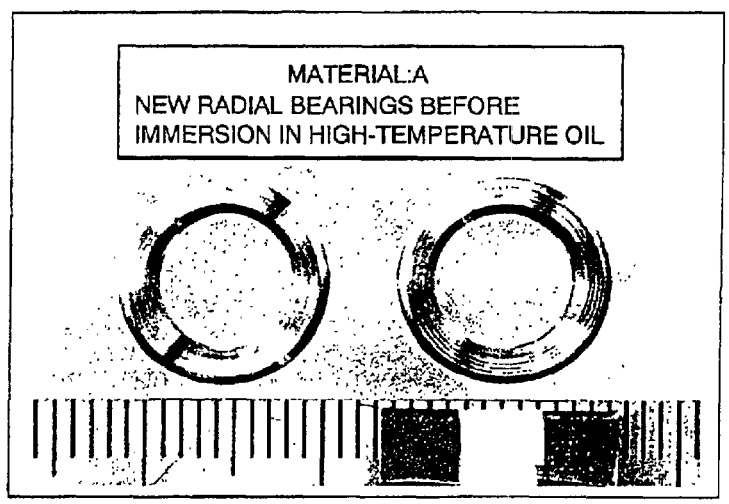
FIG. 8 is an explanatory diagram showing evaluation on abrasion resistance of the bearing members for the turbocharger according to the embodiment of the invention and those of the comparative examples.
FIG. 9 is a photograph showing a material A (radial bearings for a conventional turbocharger) shown in FIG. 5 before immersion in high-temperature oil.

FIG. 9 is an external view photograph which is a plan view of the new radial bearings 10 made of the material A before immersed in high-temperature oil. Two samples are provided. A scale is shown in the lower part of the photograph. In the radial bearings 10 in FIG. 9, although there are portions seen black due to shading of gloss, in reality, the entirety of the bearings is shining with a gloss peculiar to a brass alloy.

Figure 10:
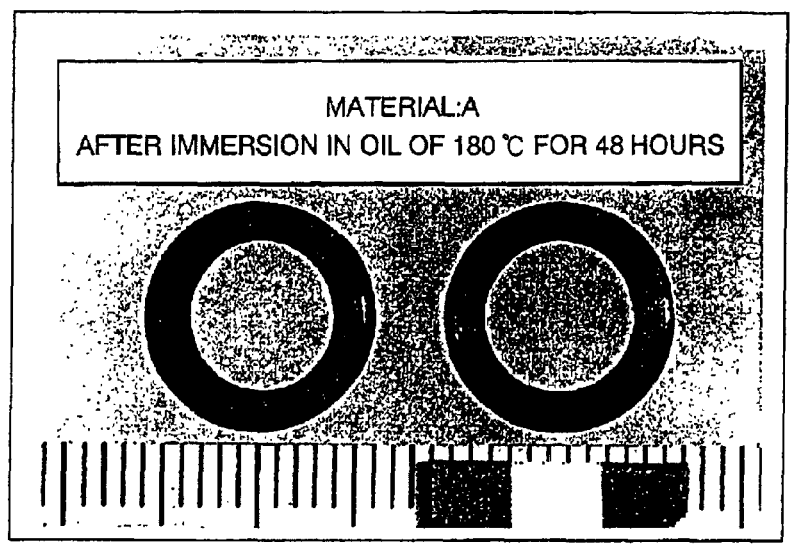
FIG. 10 is a photograph showing a state of the material A after immersion in oil of 180° C. for 48 hours.

FIG. 10 is an external view photograph showing the radial bearings (made of the material A) of FIG. 9 after being immersed in oil of 180° C. for 48 hours. In the case of the samples, after immersion in the oil of 180° C. for 48 hours, a black corrosion product is generated on the entire face, and surface peeling occurs locally.

Figure 11:
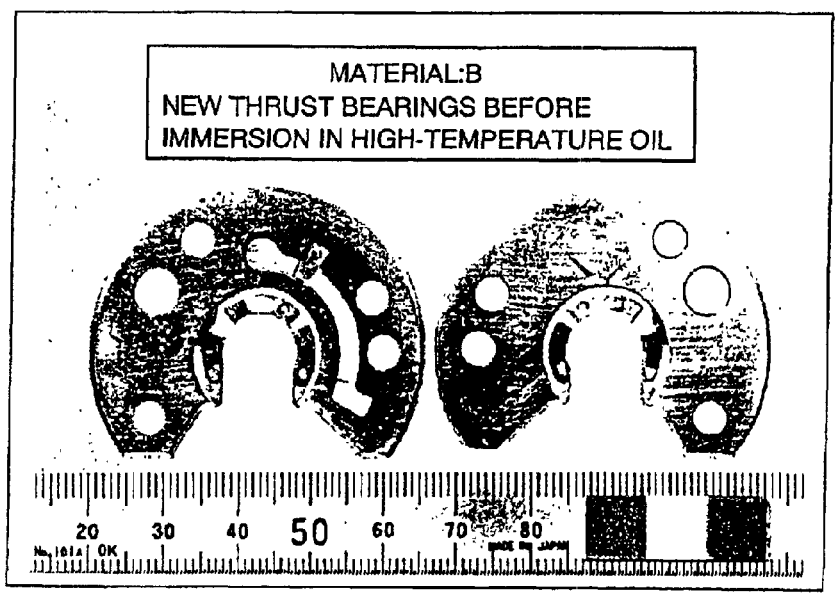
FIG. 11 is a photograph showing a material B (thrust bearings for the conventional turbocharger) shown in FIG. 5 before immersion in high-temperature oil.

FIG. 11 is an external view photograph which is a plan view of the new thrust bearings 11 in FIG. 1 made of the material B before immersed in high-temperature oil. Two samples are provided. Although the thrust bearings 11 in FIG. 11 are partly seen black due to shading of gloss, in reality, the entirety of the bearings is shining with a gloss peculiar to a bronze alloy.

Figure 12:
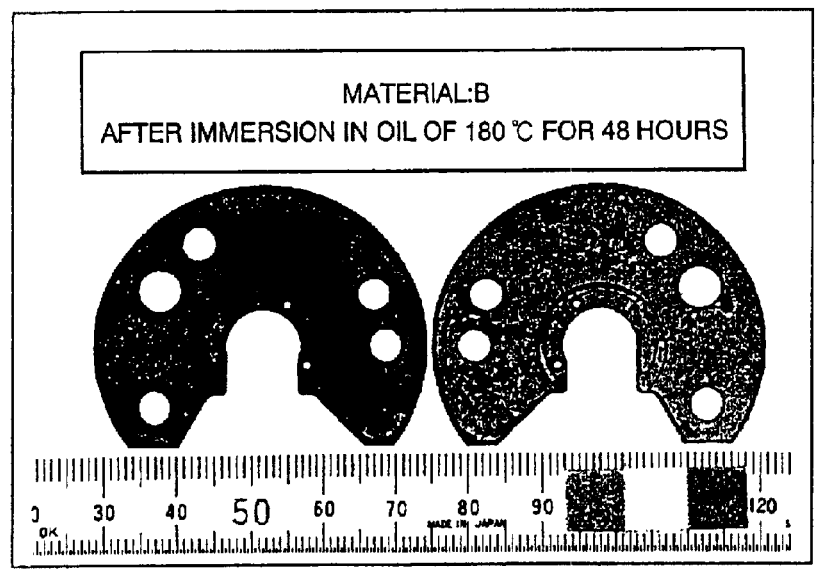
FIG. 12 is a photograph showing a state of the material B after immersion in oil of 180° C. for 48 hours.

FIG. 12 is an external view photograph showing the thrust bearings (made of the material B) of FIG. 11 after immersion in oil of 180° C. for 48 hours. In the case of these samples as well, in a manner similar to FIG. 10, after immersion in the oil of 180° C. for 48 hours, a black corrosion product is generated on the entire faces. Also, surface peeling occurs locally.

Figure 13:
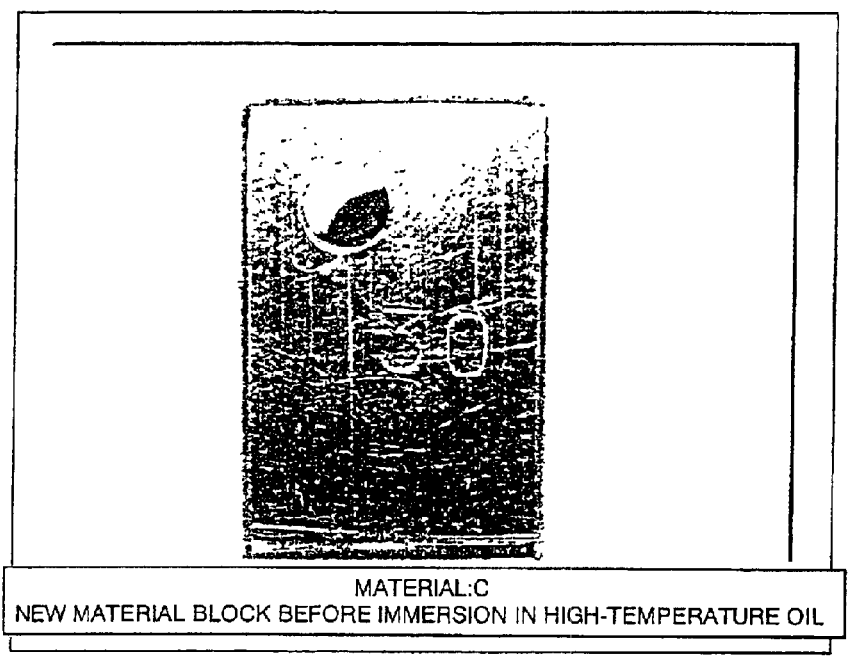
FIG. 13 is a photograph showing a new material C shown in FIG. 5 before immersion in high-temperature oil.
Figure 14:
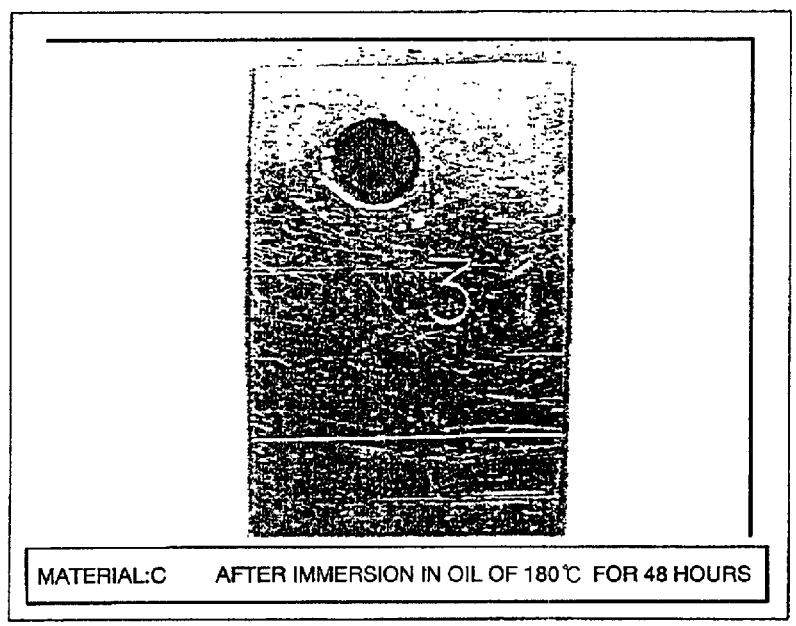
FIG. 14 is a photograph showing a state of the material C after immersion in oil of 180° C. for 48 hours.

FIG. 13 is an external view photograph which is a plan view of a new material block made of the material C as a candidate of the material of the bearing for a turbocharger before immersion in high-temperature oil. Although the material block is partly seen black due to shading of gloss, in reality, the entirety is shining with a gloss peculiar to a brass alloy. FIG. 14 is an external view photograph showing a material block made of the material C after immersion in oil of 180° C. for 48 hours. In this case, a black corrosion product is not generated in evaluation after the immersion, and there is obtained largely improved protection against corrosion in the environment of high-temperature engine oil as compared with the materials A and B according to the conventional technique. However, the material is a general bronze material and an excellent effect on abrasion resistance which will be described hereinafter cannot be expected. Particularly, it was recognized that rapid bearing abrasion occurs in slightly adverse environment such as sudden acceleration/deceleration or contamination in the engine oil supplied from the internal combustion engine.

Figure 15:
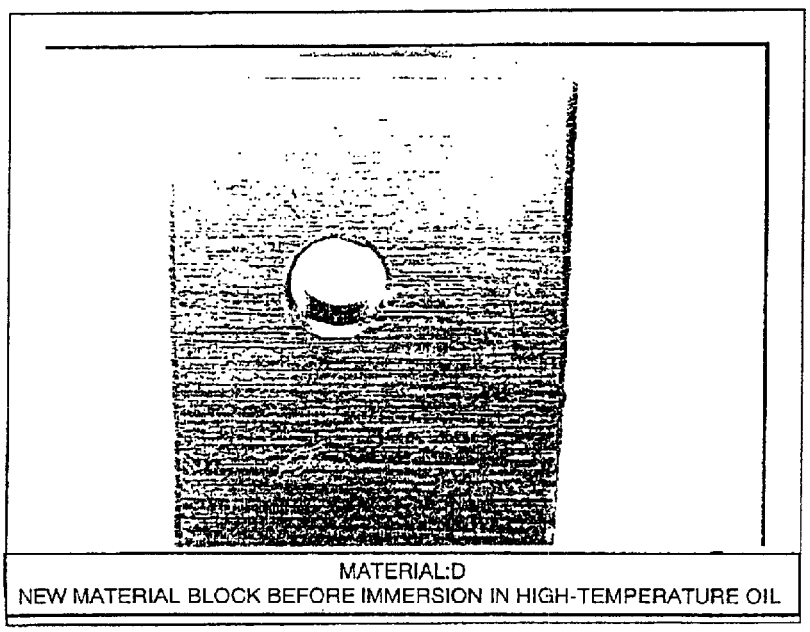
FIG. 15 is a photograph showing a new material D shown in FIG. 5 before immersion in high-temperature oil.
Figure 16:
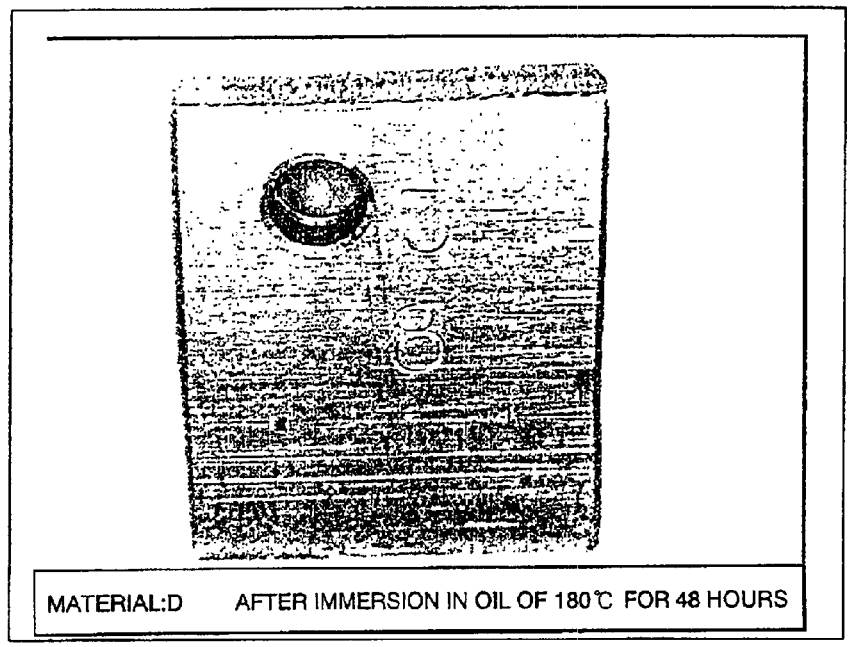
FIG. 16 is a photograph showing a state of the material D after immersion in oil of 180° C. for 48 hours.

FIG. 15 is an external view photograph which is a plan view of a new material block made of the material D as a candidate of the bearing for a turbocharger before immersion in high-temperature oil. In the diagram as well, there are portions seen black due to shading of gloss. However, in reality, the entirety of the bearings is shining with a gloss peculiar to a brass alloy. FIG. 16 is an external view photograph which is a plan view of a material block made of the material D after immersion in oil of 180° C. for 48 hours. In this case as well, in a manner similar to the material C, in evaluation after immersion, no black corrosion product is generated and a large improvement in protection against corrosion is achieved. However, an excellent effect on abrasion resistance cannot be expected.

Figure 17:
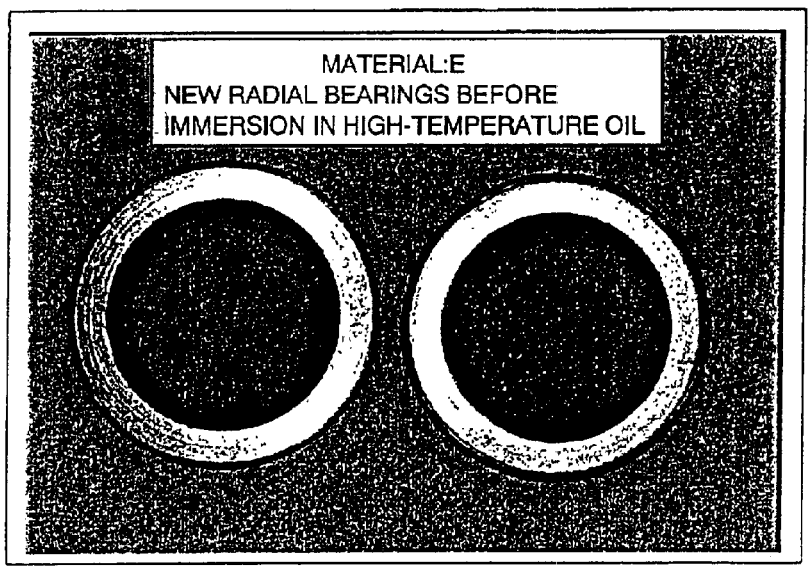
FIG. 17 is a photograph showing a new material E (radial bearings for the turbocharger according to the invention) shown in FIG. 5 before immersion in high-temperature oil.

FIG. 17 is an external view photograph which is a plan view of new radial bearings 10 of FIG. 1 made of the material E before immersion in high-temperature oil. Although the radial bearings 10 of FIG. 17 are partly seen black due to shading of gloss, in reality, the entirety of the bearings is shining with a gloss peculiar to a brass alloy.

Figure 18:
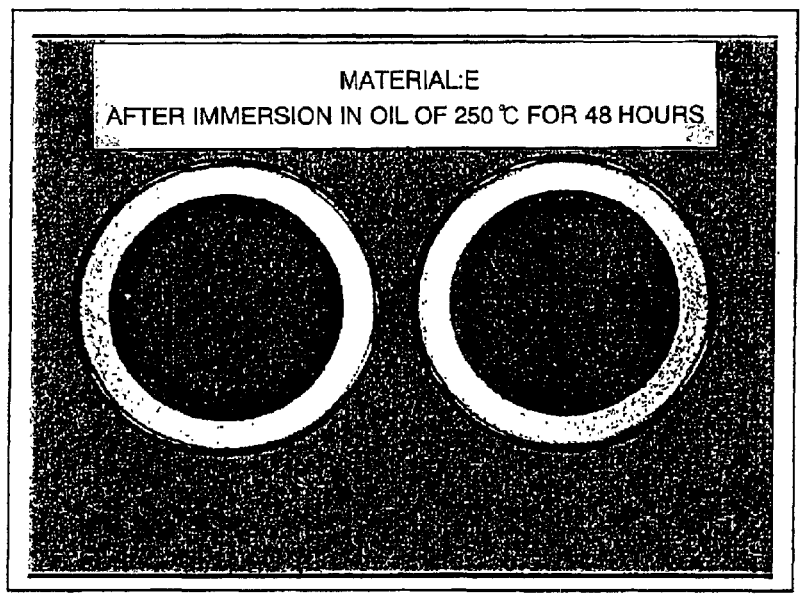
FIG. 18 is a photograph showing a state of the material E after immersion in oil of 250° C. for 48 hours.

FIG. 18 is an external view photograph of the radial bearings (made of the material E) of FIG. 17 after immersion in oil of 250° C. for 48 hours.

Figure 19:
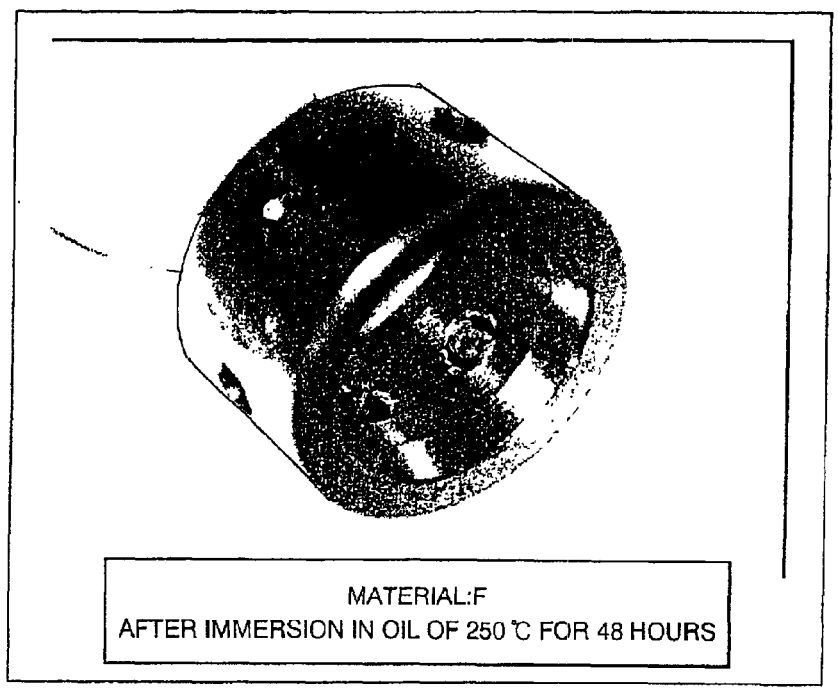
FIG. 19 is a photograph showing a material F (radial bearings for the turbocharger according to the invention) shown in FIG. 5 after immersion in oil of 250° C. for 48 hours.

FIG. 19 is an external perspective view photograph of a radial bearing used in FIG. 1 but made of the material F after immersion in oil of 250° C. for 48 hours. In the diagram as well, although the radial bearing is partly seen black due to shading of gloss, in reality, the whole bearing is shining with a gloss peculiar to a brass alloy.

In the test of the materials E and F, the temperature of immersion oil was increased to 250° C., no black corrosion product was generated. That is, in the structure of the bearing for a turbocharger according to the invention, with respect to protection against corrosion in the high-temperature engine oil environment, in a manner similar to the materials C and D as general brass materials, an effect of large improvement as compared with the conventional materials A and B was produced. The elements Cu and Zn contribute substantially to the improved effect of protection against corrosion.

Changes in weight before and after the immersion evaluation of the materials will be compared. Since the initial weights of the samples are different from each other, as shown in FIG. 7, the ratios each obtained by dividing a weight change after the immersion evaluation by the initial weight are used for comparison by setting the change in the material F to reference value 1.0.

Also in comparison of the weight changes after the high-temperature oil immersion, as compared with the conventional materials A and B, larger improvements in the materials C and D as general brass materials and the materials E and F as the embodiment of the invention were recognized. Particularly, in comparison between the material E of the embodiment of the invention and the conventional material A and in comparison between the material F of the embodiment of the invention and the conventional material B, improvements about 1/46 and 1/1065 were achieved.

As described above, in relative comparison regarding protection against corrosion, it was found the materials have excellent properties in accordance with the order of (materials C, D, E, and F), material A, and material B from the most excellent one to the least excellent one.

FIG. 4 shows cross-sectional structures in the radial and axial directions of the copper alloy materials (bearings for turbocharger) 10 and 11 containing Cu, Zn, Al, Mn, and Si as main components as the embodiment of the invention.

As shown in FIG. 4, in the bearings 10 and 11, a very small Mn—Si (manganese silicide) compound 20 is crystallized out in a Cu—Zn alloy, that is, the base structure of the brass alloy. By preliminarily performing a process of drawing out of brass by pulling-out, rolling, or the like before the bearing is molded, the Mn—Si alloy 20 is elongated in the axial direction (pull-out and rolling direction) of the alloy material as conspicuously seen in the cross-sectional structure in the axial direction in FIG. 4. Al functions as a link of Mn—Si. The Mn—Si compound 20 and Al contribute to abrasion resistance.

Abrasion resistance required for the material of a bearing for a turbocharger will now be described. The abrasion resistance is an important property like the protection against corrosion in the high-temperature oil.

FIG. 8 shows results of evaluation on abrasion obtained by relative comparison of samples having the same shape (under the same conditions of load and time for evaluation). As speeds for evaluation, two kinds of speeds which are relatively low and high speeds are shown. With respect to the abrasion amount, comparison is made with an abrasion amount μm/m per unit sliding distance.

When the abrasion amount of the material F as the embodiment of the invention was set to reference value 1.0, and the abrasion amounts of the above-described six kinds of materials were relatively compared with each other, it was found that the abrasion resistance of the materials is excellent with respect to the order of materials F, E, A, B, C, and D from the most excellent one to the least excellent one.

The abrasion amount of each of the materials E and F of the bearing for a supercharger according to the embodiment is 1/10 or less of the abrasion amount of each of the materials C and B as general brass materials having more excellent protection against corrosion than the conventional materials A and B.

In the results of comparison of protection against corrosion in FIG. 7 and results of comparison of abrasion resistance of FIG. 8, comments are shown in the columns of judgment. For example, "very good" is given to the materials which are judged as extremely good. The materials judged as "very good" are the materials E and F as the embodiment of the invention, by which a preferred bearing material can be supplied.

FIG. 6 shows a result of comparison of abrasion resistance paying attention to the directions of the Mn—Si alloy crystallized in the alloy with respect to the materials E and F as copper alloy materials having the most excellent abrasion resistance each containing Cu, Zn, Al, Mn, and Si as main components.

As a result of the abrasion resistance test, it was found that the direction of the Mn—Si compound 20 crystallized in the alloy with respect to the sliding direction of the bearing material exerts an large influence on the abrasion resistance of the bearing material. FIG. 4 shows an example of comparison of abrasion resistance in the case of giving the following to the bearing: case (1) sliding perpendicular to the diameter direction of the Mn—Sn compound 20, case (2) sliding parallel to the longitudinal direction of the compound 20, and case (3) sliding perpendicular to the longitudinal direction of the compound 20. The abrasion resistance test is an example of evaluation performed by using carbon steels S45C for machine structural use as a counter material of the bearing material under conditions of sliding speed of 0.2 m/sec, pressed face pressure of 49 MPa, and use of turbine oil lubricating.

Sliding perpendicular to the longitudinal direction of the Mn—Si compound 20 (case (3)) shows the most excellent abrasion resistance. When the abrasion amount of the bearing material is set to reference value 1.0, the abrasion amount with sliding parallel to the longitudinal direction of the Mn—Si compound 20 (case (2)) and that with sliding perpendicular to the radial direction of the Mn—Si compound 20 is 4.5 to 6.8 times for the following reason. In cases (1) and (2), as compared with case (3), the ratio of occurrence of fallout of the Mn—Si compound 20 itself is higher. Since the Mn—Si compound 20 has a hard phase, due to the fallen piece, an abrasive action is generated.

Because the fallout of the Mn—Si compound 20 causes an increase in abrasion of the counter material and deteriorates the performance of the mechanical structure, it is important to match the sliding direction of the bearing material with the direction of the Mn—Si compound 20 in the best combination. By strengthening the base material of the alloy (for example, by adding Al), fallout of the Mn—Si compound 20 can be suppressed by holding the hard phase and improving the withstand load.

Consequently, the copper alloy materials E and F have excellent characteristics of both protection against corrosion and abrasion resistance. As long as a brass alloy contains 54 to 64 wt % of Cu, 0.2 to 3.0 wt % of Si, 0.2 to 7.0 wt % of Mn, 0.5 to 3.5 wt % of Al, and the remainder of substantially Zn, improved protection against corrosion and abrasion resistance of the bearing for a turbocharger in an environment of high-temperature oil has been achieved.

Further, by making the elongating direction of the Mn—Si compound crystallized in the alloy match with required directions of the radial bearing and thrust bearing and employing the resultant material as the material of a bearing of a turbocharger for an internal combustion engine, the durability can be largely improved. The elongating direction of the Mn—Si compound is set to the axial direction of the rotation axis with respect to the radial bearing and the direction perpendicular to the rotary shaft with respect to the thrust bearing.

Although the example of using two radial bearings has been described in the embodiment, the invention is not limited to the number. For example, the invention can be applied to the case of using one radial bearing having a relatively long sleeve.

According to the embodiment, in a turbocharger, a bearing structure having excellent abrasion resistance without generating a black corrosion product even in a high-temperature oil environment, for example, when an internal combustion engine is suddenly stopped can be provided, and a supercharger with high durability can be supplied.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. In a turbocharger for an internal combustion engine, the improvement comprises a radial bearing is provided for supporting a rotary shaft and comprises a brass alloy in which an Mn—Si compound is crystallized in a brass base material, wherein said Mn—Si compound is elongated in an axial direction of said rotary shaft and is dispersed, wherein said brass alloy contains 54 to 64 wt % of Cu, 0.2 to 3.0 wt % of Si, 0.2 to 7.0 wt % of Mn, 0.5 to 3.5 wt % of Al, and a remainder substantial of Zn.

2. In the turbocharger according to claim 1, wherein said radial bearing is made of a floating metal.

3. In a turbocharger for an internal combustion engine, the improvement comprises a radial bearing is provided for supporting a rotary shaft and comprises a brass alloy in which an Mn—Si compound is crystallized in a brass base material, wherein said Mn—Si compound is elongated in an axial direction of said rotary shaft and is dispersed, further comprising a thrust bearing for supporting motion in a thrust direction of said rotary shaft, said thrust bearing being made of the same material as that of said radial bearing, wherein Mn—Si compound crystallized in said thrust bearing is elongated in a direction perpendicular to an axial direction of said rotary shaft.

4. In an internal combustion engine, the improvement comprises a turbocharger having a rotary shaft, a radial bearing for supporting said rotary shaft and comprising a brass alloy in which an Mn—Si compound is crystallized in a brass base material, wherein said Mn—Si compound is elongated needlelike in an axial direction of said rotary shaft and is dispersed and said brass alloy contains 54 to 64 wt % of Cu, 0.2 to 3.0 wt % of Si, 0.2 to 7.0 wt % of Mn, 0.5 to 3.5 wt % of Al; and a remainder substantially of Zn.

* * * * *